June 30, 1931. C. DRÜPPEL 1,812,518
GUIDE FOR THE CURRENT SUPPLY CABLE OF ELECTRIC IRONS
Filed May 10, 1929
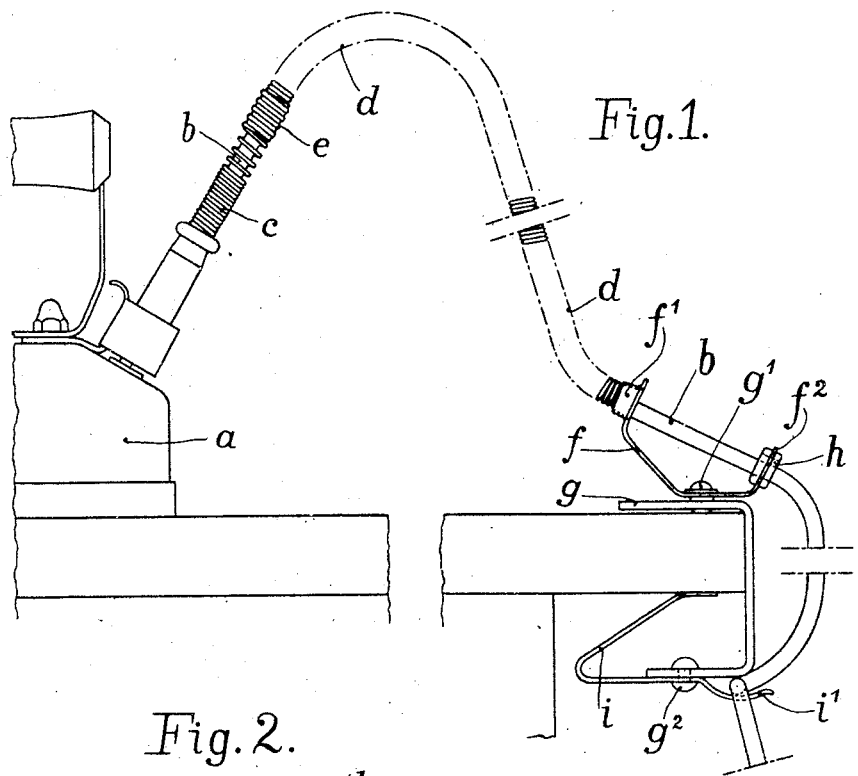
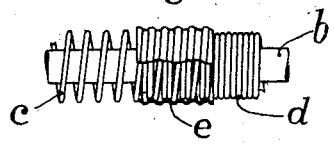
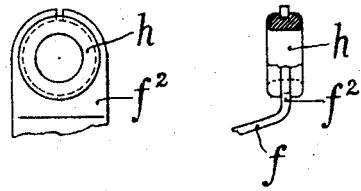
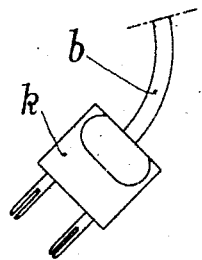
INVENTOR.
Clare Drüppel.
By William C. Linton
Attorney.

Patented June 30, 1931

1,812,518

UNITED STATES PATENT OFFICE

CLÄRE DRÜPPEL, OF BOTTROP, GERMANY, ASSIGNOR TO BERNHARD QUENDT, OF ESSEN-RUHR, GERMANY

GUIDE FOR THE CURRENT SUPPLY CABLE OF ELECTRIC IRONS

Application filed May 10, 1929, Serial No. 362,054, and in Germany June 30, 1927.

The invention concerns a device for guiding the current supply cable of electric irons. Its object is to prevent the cable coming to lie on the linen during ironing, soiling it and being a hindrance to the work; its object is further to prevent the cable getting under the hot iron during ironing because in this way the insulation of the cable might easily be injured and short circuit be caused in the lead; finally it aims at preventing any pull being exerted during ironing on the plug contact in the wall, by too wide a sweep of the iron, because in that case the wire ends in the plug contact get loose and a short circuit may also result.

This object is secured according to the invention by placing the cable in an elastic guide tube consisting of a spiral spring, the ends of which are fixed to the iron and to a crank lever mounted so that it can swing on a table clamp, which lever follows the movement of the iron so that the cable is relieved of the pull of the iron.

On the drawings a constructional example of the invention is shown,

Fig. 1 illustrating (in a side view) the device fixed to a table plate and connected with an iron, Fig. 2 a detail on an enlarged scale, and Figs. 3 and 4 the front and side elevation of a part, in part section.

$a$ is an electric iron, the current supply cable $b$ of which is secured against kinking by a short spiral spring $c$. To the spiral spring $c$ there is fixed a long spiral spring $d$ by means of a screw socket $e$ passed over it and made of pressed metal plate; the fixing is effected by the last threads of both spiral springs being inserted into each other whereupon the screw socket or coupling box $e$ is screwed firmly on to the point of connection (see also Fig. 2). The other end of the spiral spring $b$ is fixed to one arm $f^1$ of a U-shaped strap $f$ which is at $g^1$ mounted so as to be easily rotatable on the upper leg of a table clamp $g$. The other arm $f^2$ of the strap is not run so high as the arm $f^1$, and is provided, in a bore, with a bushing $h$ which serves as a guide for the cable $b$. To the lower leg of the table clamp $g$ there is fixed a spring $i$ which is extended beyond the fixing point $g^2$ and is so bent that it can serve as a gripping device $i^1$ for the cable $b$. The free end of the cable $b$ is fitted with a plug $k$ by which the iron can be connected up to a current supply.

The way in which the device described operates, is as follows: Before the ironing is begun the table clamp $g$ is fixed to the ironing table, then the iron $a$ is pulled away from the table clamp to the extent to which the iron is to reach when ironing. In this position of the iron the cable $b$ projecting out of the spiral spring $d$ is pressed into the gripping device $i^1$; by this means the plug $k$, mounted at the end of the cable $b$, is relieved of the pull of the iron so that the ends of the cable no longer run the risk of being torn away. When the plug $k$ has been put in, ironing can be begun. In the to and fro movement of the iron $a$ the cable lies in the expanding and contracting spiral spring $d$, which remains under compression and at a certain height above the linen without coming into contact with the latter. If, in ironing, a very close approach is made to the table clamp $g$ then the spiral spring $d$ always bends away upwards because its fixing at both ends is directed upwards towards the middle. The cable $b$ drawn into the spiral spring $d$ and coming out again in the ironing movement finds a smooth guide in the bush $h$. If this guide is dispensed with then the arm $f^2$ can be done away with so that the strap $f$ is replaced by an angle piece mounted so that it can rock. The essential thing is that the mounting of the holder $f$ in this case likewise is not effected vertically below the point of fixing of the spiral spring, in order that the crank lever may also follow the movement of the iron by swinging about its point of mounting $g^1$; only in this way is perfect guiding of the cable $b$ ensured.

In the place of the above described extremely strong and reliable connection formed by the coupling box $e$ between the spiral springs $c$ and $d$ any other connection may also be used.

I claim:

1. A guide for the current feed cable of electric irons, comprising a table clamp, a substantially U-shaped strap mounted on said table clamp to swing about a vertical axis, an elastic guide tube attached to one end of said U-shaped strap and to the iron, a current feed cable placed in said guide tube, and a table clamp spring prolonged beyond the fixing point whereby to form a gripping device for the cable.

2. A guide for the current feed cable of electric irons, comprising a table clamp, means carried by said table clamp for guiding the current feed cable, and a table clamp spring prolonged beyond the fixing point whereby to form a gripping device for the cable.

3. A guide for the current feed cable of electric irons, comprising a table clamp, a lever mounted on said table clamp to swing about a vertical axis, and having an arm extended upwardly and out of alinement with the swinging axis of the lever, an elastic guide tube having one end fixed to the iron, means formed with the free end of the extended arm of said lever for securely fixing the remaining end of said guide thereto, whereby to cause the arm through said guide to follow the movements of the iron.

4. A guide for the current feed cable of electric irons, comprising a table clamp, a lever mounted on said table clamp to swing about a vertical axis, and having an arm extended upwardly and out of alinement with the swinging axis of the lever, an elastic guide tube attached to the free end of the extended arm of the lever and to the iron, a current feed cable placed in said guide tube, and a gripping device for the cable carried by said clamp.

In witness whereof I have hereunto set my hand.

CLÄRE DRÜPPEL.